(12) United States Patent
Shiina

(10) Patent No.: US 7,652,796 B2
(45) Date of Patent: Jan. 26, 2010

(54) IMAGE PROCESSING DEVICE, IMAGE PROCESSING SYSTEM, COMPUTER READABLE RECORDING MEDIUM, AND IMAGE PROCESSING METHOD

(75) Inventor: Katsumi Shiina, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 261 days.

(21) Appl. No.: 11/979,524

(22) Filed: Nov. 5, 2007

(65) Prior Publication Data
US 2008/0165389 A1 Jul. 10, 2008

(30) Foreign Application Priority Data
Jan. 9, 2007 (JP) ............................. 2007-001838

(51) Int. Cl.
G06F 3/12 (2006.01)
G06K 15/02 (2006.01)
H04N 1/40 (2006.01)
H04N 1/46 (2006.01)
G06K 9/00 (2006.01)
G08B 13/14 (2006.01)

(52) U.S. Cl. .................... 358/3.28; 358/1.1; 358/1.2; 358/540; 358/450; 382/112; 340/572.1

(58) Field of Classification Search ............... 358/3.28, 358/1.1, 1.2, 540, 450; 382/112; 340/572.1
See application file for complete search history.

(56) References Cited

U.S. PATENT DOCUMENTS

| 7,495,559 B2* | 2/2009 | Nagai et al. ............... 340/572.1 |
| 2002/0170973 A1 | 11/2002 | Teraura |
| 2005/0029353 A1* | 2/2005 | Isemura et al. .............. 235/454 |
| 2006/0061814 A1* | 3/2006 | Tokunaga ................... 358/1.15 |
| 2008/0294585 A1* | 11/2008 | Hwang et al. .................. 706/47 |

FOREIGN PATENT DOCUMENTS

JP      A 2002-337426      11/2002

* cited by examiner

Primary Examiner—Edward L Coles
Assistant Examiner—Charlotte M Baker
(74) Attorney, Agent, or Firm—Oliff & Berridge, PLC

(57) ABSTRACT

An image processing device includes: an image reader that optically reads a first image of an image processing object having a non-contact element attached thereto, the non-contact element including a memory member; an identification information reader that reads identification information from the memory member, the identification information being used for identifying the image processing object; an incorporating unit that combines the first image and a second image corresponding to the identification information; and a controller that performs a control operation so that the first image reduced to a size corresponding to the output region of the second image is recovered to the original size of the first image and is output, when a combined image of the first image and the second image is output.

10 Claims, 7 Drawing Sheets

IMAGE PROCESSING DEVICE, IMAGE PROCESSING SYSTEM, COMPUTER READABLE RECORDING MEDIUM, AND IMAGE PROCESSING METHOD

CROSS-REFERENCE TO RELATED APPLICATIONS

This application is based on and claims priority under 35 USC 119 from Japanese Patent Application No. 2007-001838 filed Jan. 9, 2007.

BACKGROUND

1. Technical Field

The present invention relates to an image processing device, an image processing system, a computer readable recording medium, and an image processing method.

2. Related Art

There have been known image processing devices that copy a QR code (Quick Response code) that is one of a two-dimensional code (hereinafter referred to as the second image) on a recording sheet, together with an image written or drawn on an original document (hereinafter referred to as the first image).

SUMMARY

According to an aspect of the invention, there is provided an image processing device including: an image reader that optically reads a first image of an image processing object having a non-contact element attached thereto, the non-contact element including a memory member; an identification information reader that reads identification information from the memory member, the identification information being used for identifying the image processing object; an incorporating unit that combines the first image and a second image corresponding to the identification information; and a controller that performs a control operation so that the first image reduced to a size corresponding to an output region of the second image is recovered to an original size of the first image and is output, when a combined image of the first image and the second image is output.

BRIEF DESCRIPTION OF THE DRAWINGS

Exemplary embodiments of the present invention will be described in detail based on the following figures, wherein.

DETAILED DESCRIPTION

The following is a description of exemplary embodiments of the present invention, with reference to the accompanying drawings.

Figure 1:
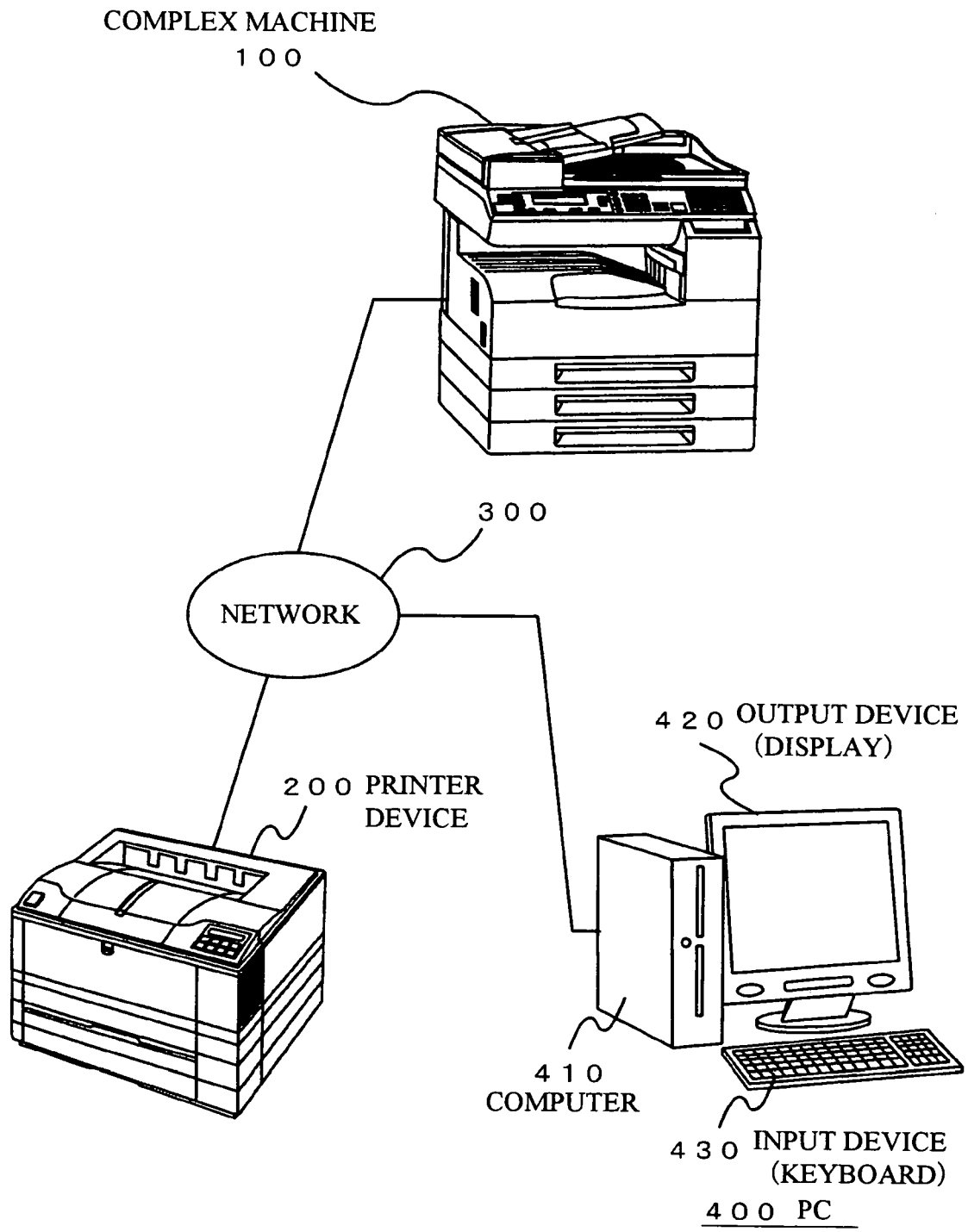
FIG. 1 shows the structure of an image processing system in accordance with the present invention.

FIG. 1 shows the structure of an image processing system in accordance with an exemplary embodiment of the present invention. As shown in FIG. 1, the image processing system includes a complex machine 100, a printer device 200, and a PC (Personal Computer) 400. The complex machine 100, the printer device 200, and the PC 400 are connected to each other via a network 300 formed with cables and network devices.

The complex machine 100 is an example of an image processing device of the present invention. The complex machine 100 includes at least one of the following functions: a print function, a copy function, a facsimile function, a scanner function, a transmission/reception function for transmitting and receiving image information and electronic mail, a noise elimination function, and an OCR (Optical Character Reader) function, for example. Those functions are activated in accordance with an operation by a user. The OCR function involves an operation of optically reading characters.

The printer device 200 performs a printing operation in accordance with an instruction from the complex machine 100. For example, the complex machine 100 transmits an original document or the like that is read with the scanner function as image information to the printer device 200. The printer device 200 prints out the received image information onto a recording sheet or the like.

The printer device 200 is not limited to the structure shown in the drawing, but may be the same as the above-described complex machine. Also, the number of devices is not limited to the number of devices shown in the drawing. The network 300 may be a wireless communication network, for example.

The PC 400 includes a computer 410, an output device (a display) 420, and an input device (a keyboard) 430. For example, the complex machine 100 transmits an original document read with the scanner function as image information to the PC 400, and the PC 400 outputs the received image information to the output device 420.

Figure 2:
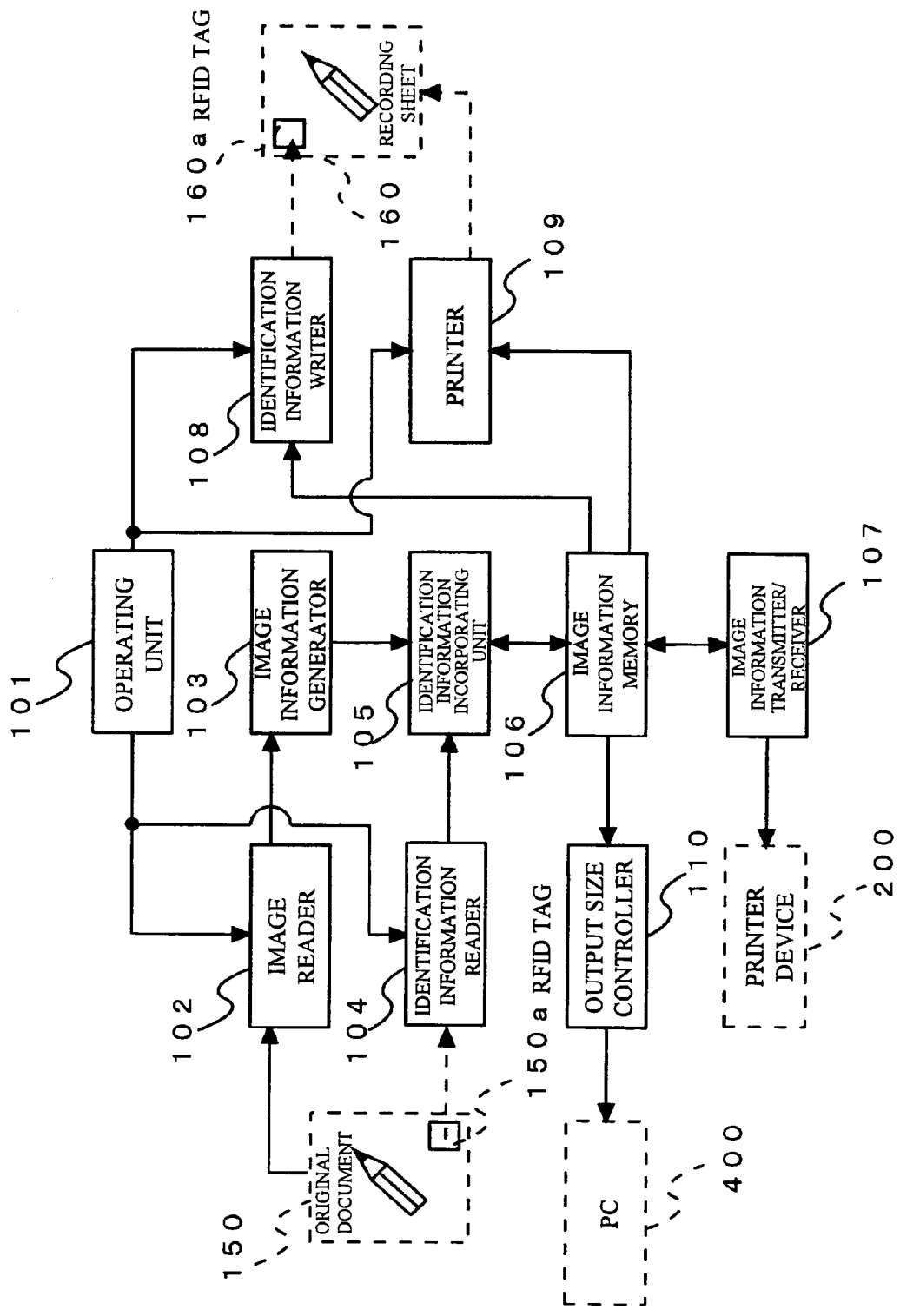
FIG. 2 is a functional block diagram showing the components of the complex machine.
Figure 3:
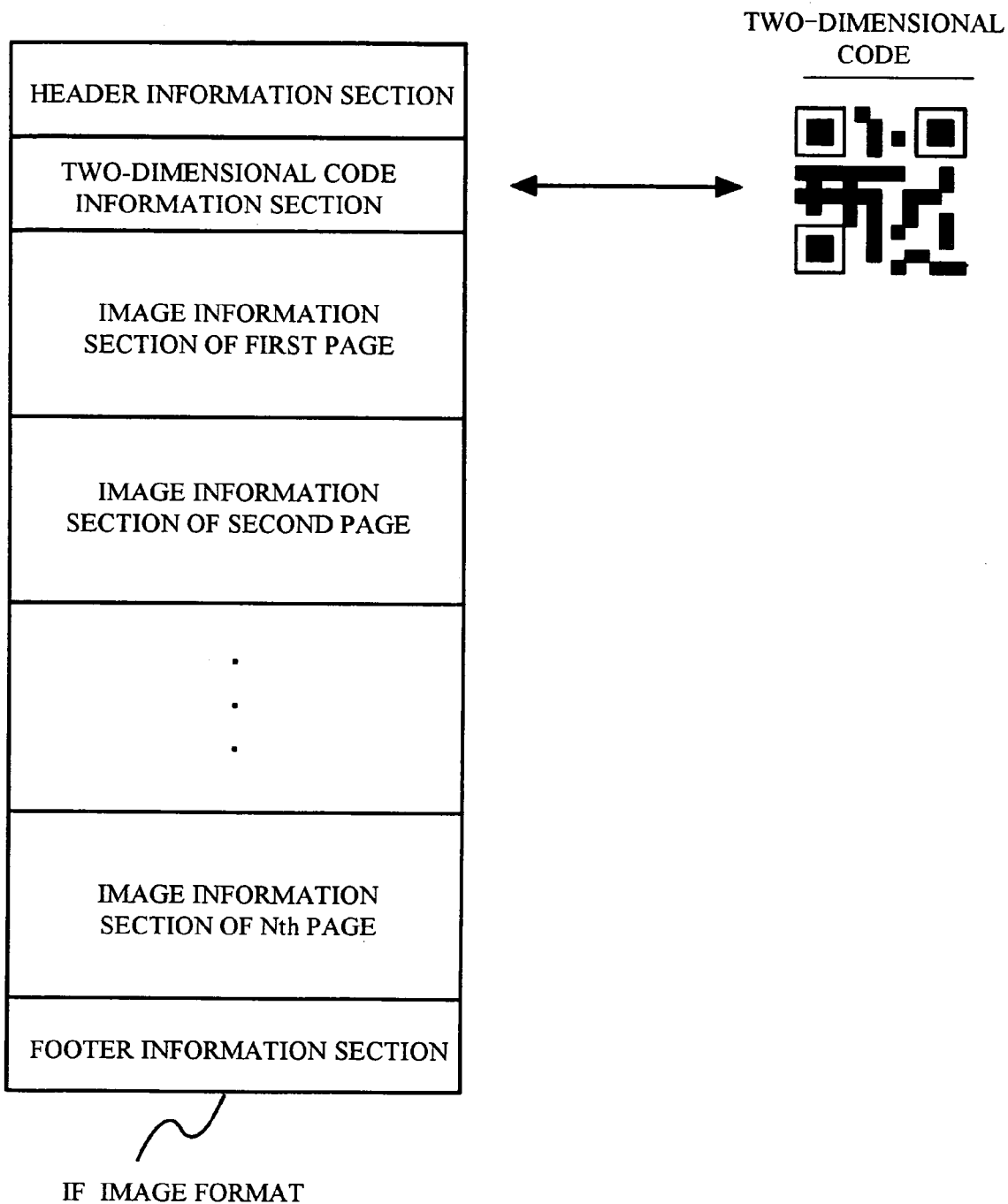
FIG. 3 is a conceptual view of an image format.

Referring now to FIGS. 2 and 3, the above-described complex machine 100 is described in greater detail.

FIG. 2 is a block diagram showing the components of the complex machine 100, and FIG. 3 is a conceptual view of an image format. The respective functional blocks shown in FIG. 2 are formed with a processing device such as a CPU (Central Processing Unit), semiconductor memory devices such as a DRAM (Dynamic Random Access Memory), a SRAM (Static RAM), and a ROM (Read Only Memory), a magnetic disk such as a HD (Hard Disc), necessary software, and the likes. A program stored in the ROM is read in by the CPU, and the CPU performs an operation in accordance with the program, so as to realize the functions of the respective devices.

As shown in FIG. 2, the complex machine 100 includes an operating unit 101, an image reader 102, an image information generator 103, an identification information reader 104, an identification information incorporating unit 105, an image information memory 106, an image information transmitter/receiver 107, an identification information writer 108, a printer 109, and an output size controller 110. The image information generator 103, the identification information incorporating unit 105, the output size controller 110, and the likes form the controller of the present invention.

The operating unit 101 is formed with a liquid crystal display, a speaker, and the likes. The liquid crystal display is of a touch panel type, for example, and the operation contents related to image processing are output to the liquid crystal display. When the icon of an operation content is pressed by a user, the image reader 102 or the like functions in accordance with the instruction. When an operation of a function is ended, the message to that effect is output to the liquid crystal display, and a sound alarm to inform the user of the end of the operation is output. An operation related to image processing is not limited to a touch panel operation involving a liquid crystal display, but may be an operation a tablet type or pressing of an operating mechanism incorporated into the complex machine 100.

The image reader 102 is an example of the image reader of the present invention, and is formed with a carriage on which a lens, a linear CCD (Charge Coupled Device), a lamp, and the likes are mounted. In accordance with an instruction from the operating unit 101, the carriage moves and optically reads a first image from an original document 150 set on the complex machine 100. A pencil is drawn as an example of the first image on the original document 150. After reading the original document 150, the image reader 102 transmits the read result to the image information generator 103, and informs the operating unit 101 of the end of the reading. In this embodiment, the original document 150 is used as an example of an image processing object. However, it is not necessary to use an original document, as long as the original can function as an image processing object. Also, the material of the original document 150 is not particularly limited, and may be paper, plastic, metal, or the like.

The image information generator 103 generates image information based on the image that is the read result. The image information may be formed with a bitmap, an XPS (XML Paper Specification), or the like. The image information includes a header information section indicating the top of the image information, a footer information section indicating the end of the image information, and one or more image information sections having the read image stored therein.

The identification information reader 104 is an example of the identification information reader of the present invention, and may be a RFID reader (Radio Frequency Identification reader), for example. In a case where a non-contact element (a RFID tag) 150a is attached to the original document 150, the identification information reader 104 has the function of reading the identification information stored in the memory of the non-contact element 150a through a wireless communication. The identification information includes the identification number of the user, the management location of the manager of the original document 150, and the contents written or drawn on the original document 150. For example, it is possible to determine the degree of confidentiality by detecting the identification information.

The identification information incorporating unit 105 incorporates a two-dimensional code as an example of a second image according to the identification information into the image information, so that the two-dimensional code is integrally formed with the first image at the time of output. More specifically, as shown in FIG. 3, a two-dimensional code information section is incorporated into the image information in the form of an image format formed with the header information section, the footer information section and the image information sections of the respective pages. The two-dimensional code information section is a section in which the information for outputting a QR code shown as an example of a two-dimensional code in FIG. 3 to a recording sheet 160 or the like is stored. In this manner, the identification information stored in the non-contact element 150a of the original document 150 is coded and stored at a certain portion of the image information.

The two-dimensional code information includes the information related to the size in which the two-dimensional code is printed out on the recording sheet 160 or is output to the output device 420. The size is determined so that the two-dimensional code can be fit on the recording sheet 160 at the same time as the size of the first image to be printed out on the recording sheet 160 is determined. Also, the size is determined so that the two-dimensional code can be fit in the output device 420 at the same time as the size of the first image to be output to the output device 420 is determined. The two-dimensional code may not necessarily be a QR code, but may be PDF 417, DataMatrix, MaxiCode, or the like. In a case where any of those two-dimensional codes is used, a reader compatible with the type of the two-dimensional code should be employed.

In the image information memory 106, image information including the two-dimensional code information section is stored. Accordingly, a device having an output function such as a printer device or an output device accesses the image information memory 106, so as to output an image including a two-dimensional code.

The image information transmitter/receiver 107 is formed with a modem, a terminal adaptor, a device for converting a digital signal into an analog signal, or the like. The image information transmitter/receiver 107 transmits image information to the printer device 200, and receives control information or the like from the printer device 200. In a case where a device connected to the image information transmitter/receiver 107 is a complex machine, the image information transmitter/receiver 107 receives image information or the like. Since image information includes identification information, an image is recorded on the recording sheet 160 when printing is performed in the complex machine or the printing device as the transmission destination, and, in a case where a non-contact element 160a is attached to the recording sheet 160, the identification information is written in the memory of the non-contact element 160a. In this manner, the identification information is incorporated into the image information, the image is printed out at the transmission destination, and the identification information is written on the non-contact element 160a of the recording sheet 160 or the like, so that the identification information is transmitted together with the image, and image readout can be controlled with the use of the identification information. At the time of transmission or reception of image information, it is preferable that the image information is encrypted by an encrypting unit such as a SSL (Secure Socket Layer) or S/MIME (Secure Multipurpose Internet Mail Extensions). The image information transmitter/receiver 107 may not have both functions of a transmitter and a receiver, but may have only one of the two functions.

The identification information writer 108 is an example of the identification information writer of the present invention, and may be a RFID writer (Radio Frequency Identification writer) or the like. The identification information writer 108 writes the identification information incorporated into the image information on the memory of the non-contact element 160a attached to the recording sheet 160 through a wireless communication. The recording sheet 160 is an example of the recording medium of the present invention. The material of the recording sheet 160 is not necessarily paper, but may be plastic or metal. The non-contact element 160a may have a communication unit.

The printer 109 is an example of the printer of the present invention, and may be formed with a laser source, a charger, a reflection mirror, a toner cartridge, and the likes. In accordance with an instruction from the operating unit 101, the printer 109 removes the second image from a combined image of the first image and the second image, and prints out the combined image in the original size of the first image. The recovered original size of the first image is equivalent to or preferably is the same as the size of the first image observed at the time of image reading. The equivalent size is almost the same size as the original size, including an error caused at the time of printing. The printer 109 may be designed to function only when the user identification number that is input through the operating unit 101 is the same as the user identification number represented by the two-dimensional code. Also, the printer 109 may be designed to print out an image including the two-dimensional code.

The output size controller 110 performs such a control operation that the first image reduced in size according to the output region of the two-dimensional code is recovered to the original size of the first image and is then output. Accordingly, in the PC 400, a size reduction of the first image to be output onto the output device 420 is prevented.

Referring now to FIGS. 4 through 6B, operations to be performed by the complex machine 100 are described.

Figure 4:
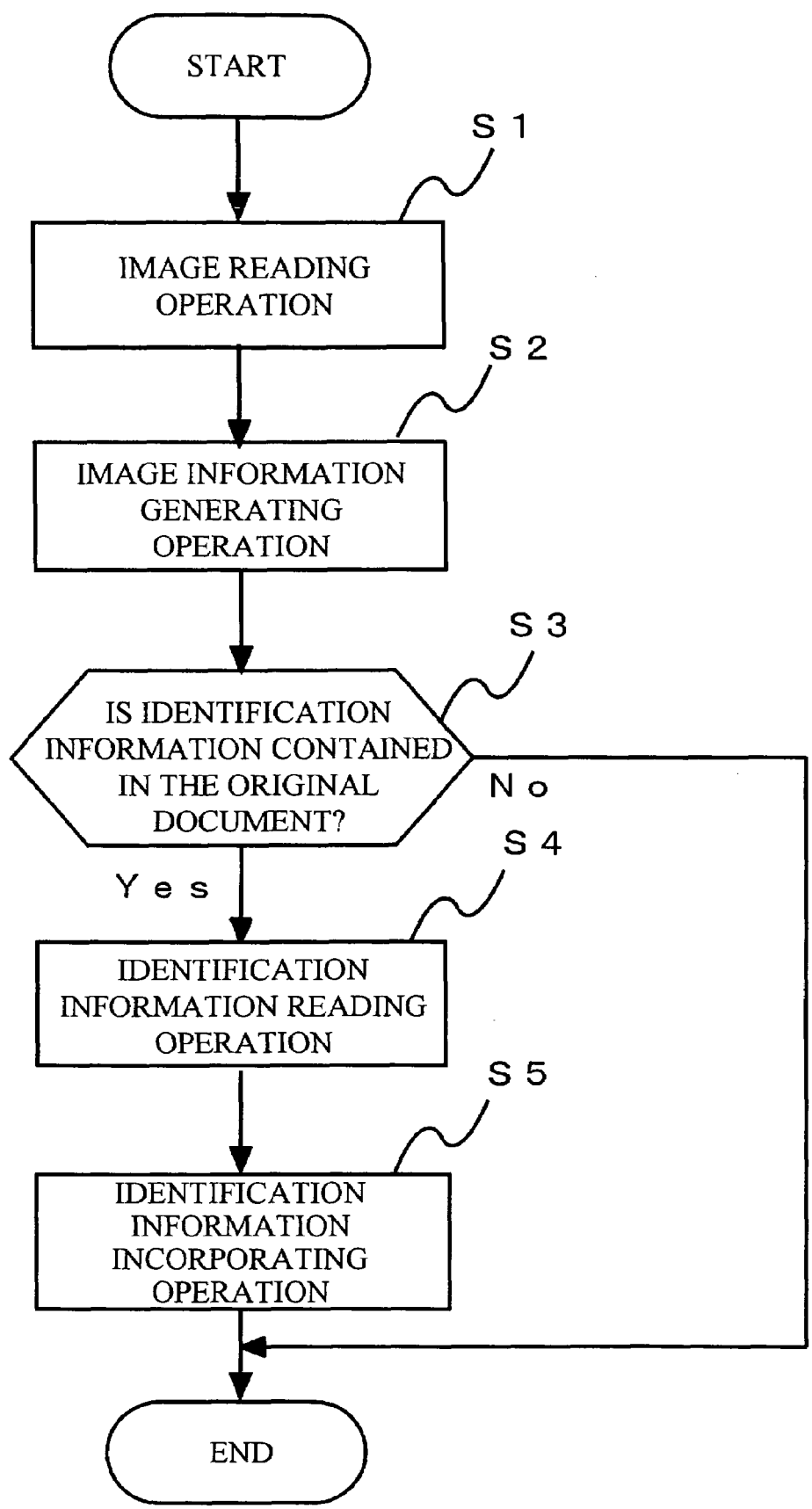
FIG. 4 is a flowchart showing an example of an image information generating operation to be performed by the complex machine.

FIG. 4 is a flowchart showing an example of an image information generating operation to be performed by the complex machine 100.

First, in accordance with an operation that is input by a user, the complex machine 100 optically reads the first image from the original document 150 placed on the complex machine 100 (step S1), and generates image information corresponding to the image (step S2). If the original document 150 is formed with more than one page, a control operation may be performed so that the pages of the original document 150 are read in a continuous manner, and one piece of image information containing more than one first image is formed.

The complex machine 100 determines, through the identification information reader 104, whether the non-contact element 150*a* is attached to the original document 150, and identification information is stored in the memory of the non-contact element 150*a* (step S3).

If identification information is stored in the original document 150, the complex machine 100 reads the identification information (step S4). The reading is performed in a non-contact manner such as a wireless communication. The complex machine 100 then incorporates the identification information into the image information that is generated in step S2 (step S5). The identification information is incorporated into the image information, so that a two-dimensional code as the second image is formed when the identification information is printed out on the recording sheet 160. For example, if the non-contact element 160*a* is not attached to the recording sheet 160, the identification information is printed out as a two-dimensional code on the recording sheet 160. If the complex machine 100 determines that the original document 150 does not contain identification information, the operation comes to an end.

Figure 5:
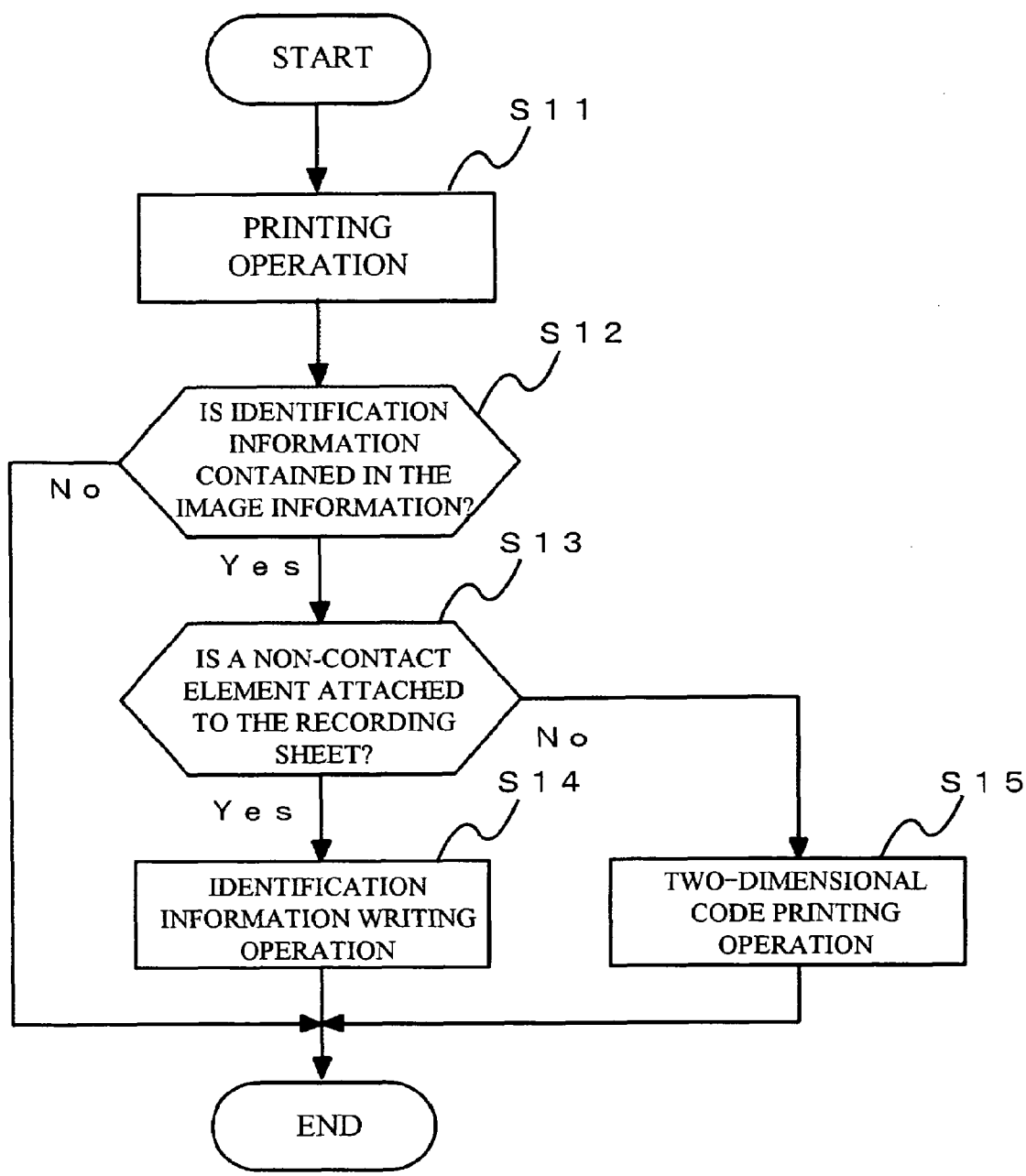
FIG. 5 is a flowchart showing an example of a printing operation to be performed by the complex machine.
Figure 6A:
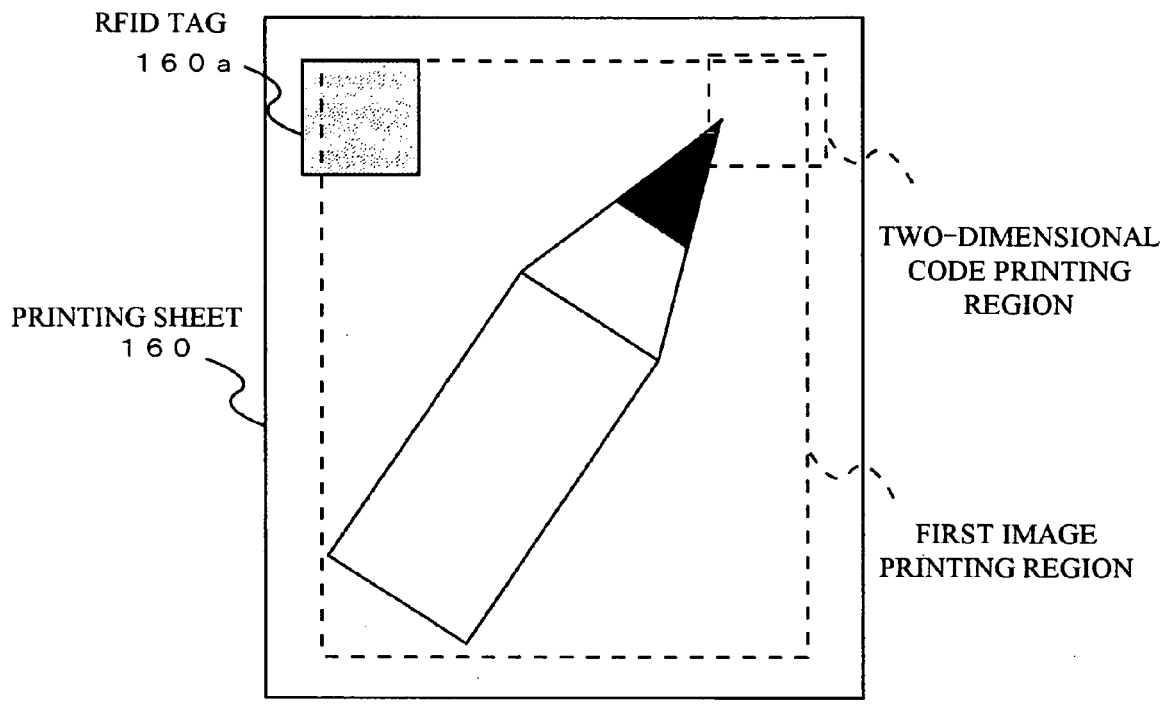
FIGS. 6A and 6B show examples of images printed out on a printing sheet.
Figure 6B:
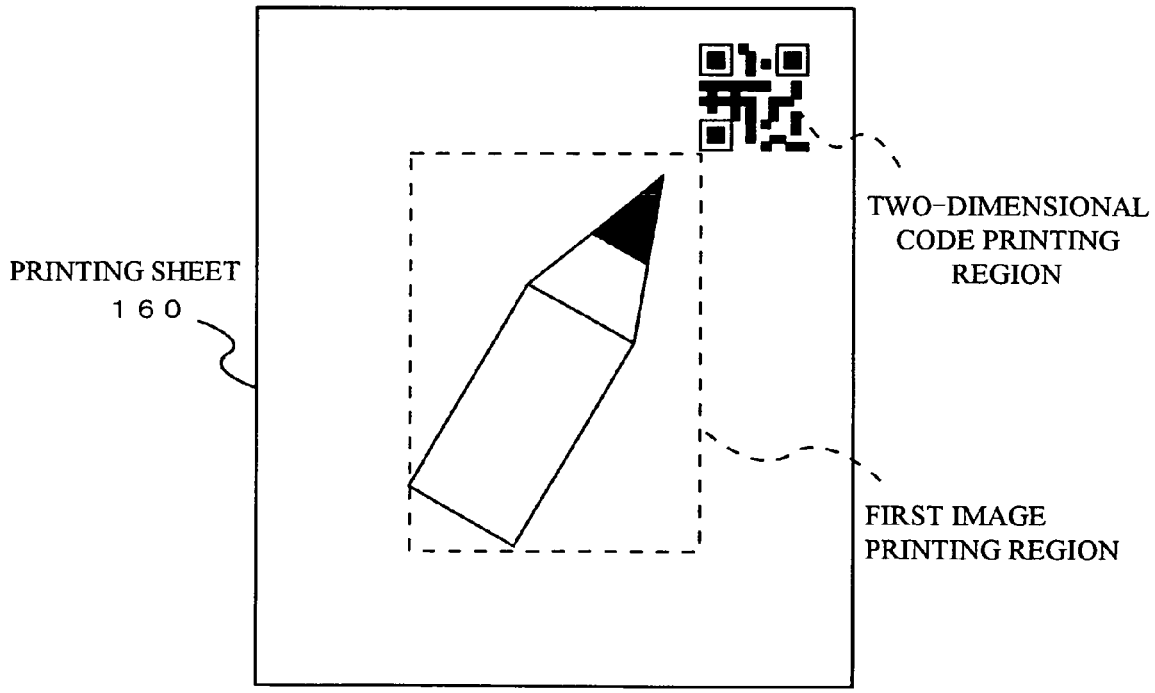

FIG. 5 is a flowchart showing an example of a printing operation to be performed by the complex machine 100. FIGS. 6A and 6B show examples of images printed out on the recording sheet 160.

First, in accordance with an operation that is input by a user, the complex machine 100 starts a printing operation to print out an image corresponding to image information (step S11). The complex machine 100 then determines whether identification information is incorporated into the image information (step S12).

If identification information is incorporated into the image information, the complex machine 100 determines whether the non-contact element 160*a* is attached to the recording sheet 160 (step S13).

If the non-contact element 160*a* is attached to the recording sheet 160, the complex machine 100 writes the identification information incorporated into the image information on the non-contact element 160*a* (step S14), and performs such a control operation that a two-dimensional code as the second image is not printed out. The complex machine 100 then enlarges the image to the size of the two-dimensional code printing region, and prints out the image onto the recording sheet 160. The writing of the identification information may be performed during the printing of the image onto the recording sheet 160, or before or after the printing. As a result, on the recording sheet 160, the image is printed out in substantially the same size as the size of the image on the original document 150, and the identification information is not written on the non-contact element 160*a*, as shown in FIG. 6A.

If the non-contact element 160*a* is not attached to the recording sheet 160, the complex machine 100 prints out the identification information incorporated into the image information as a two-dimensional code on the recording sheet 160 (step S15), and reduces the image to such a size as not to touch the two-dimensional code printing region on the recording sheet 160. The complex machine 100 then prints out the image on the recording sheet 160. As a result, a two-dimensional code is also printed out, while the reduced first image is printed out, as shown in FIG. 6B.

If the complex machine 100 determines in step S12 that identification information is not incorporated into the image information, the complex machine 100 prints out the image on the recording sheet 160, and ends the operation.

Figure 7A:
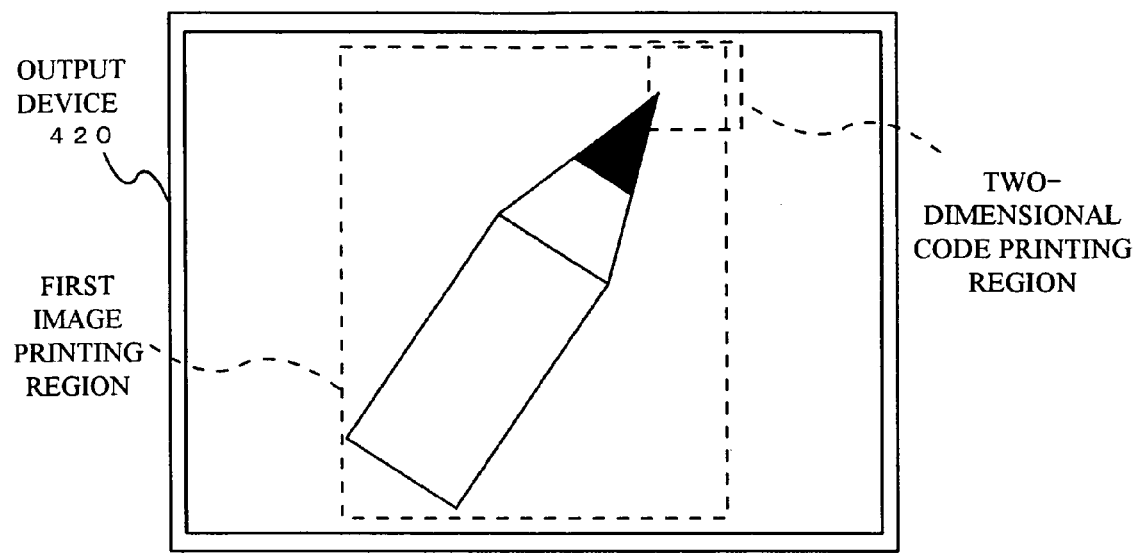
FIGS. 7A and 7B show examples of images output on an output device.
Figure 7B:
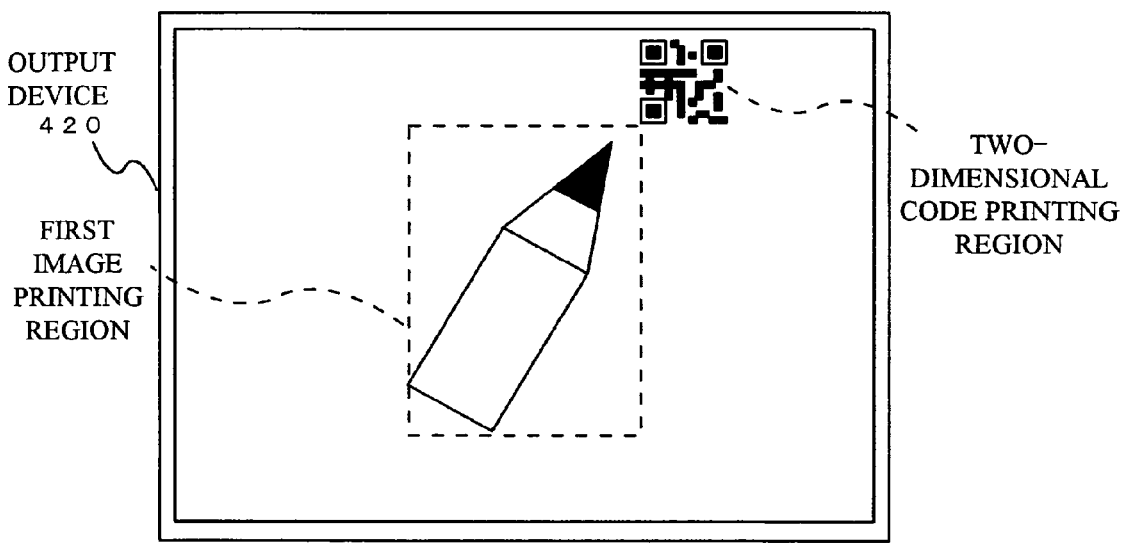

Referring now to FIGS. 7A and 7B, cases where image information is output to the output device 420 are described.

FIGS. 7A and 7B show example cases where image information is output to the output device 420.

As for the above-described exemplary embodiment, examples of printing operations have been described. However, the same results can be achieved through output operations at the output device 420. For example, as shown in FIG. 7A, by performing such a control operation as not to output a two-dimensional code, the output device 420 outputs the first image in substantially the same size as the size of the first image read by the complex machine 100.

On the other hand, in a case where a control operation is performed so as to output a two-dimensional code, the first image to be output is reduced to such a size as not to touch the two-dimensional code output region, as shown in FIG. 7B. In this manner, the two-dimensional code output region onto which the two-dimensional code is to be output can be secured.

The present invention is not limited to the above-described exemplary embodiments, but various changes may be made to them without departing from the scope of the invention. For example, a program in accordance with the present invention may be provided through a communication, or may be stored in a recording medium such as a CD-ROM.

As described so far, in accordance with the present invention, with a two-dimensional code to be output, a reduction of the image to the output to an output device or the like can be prevented, which indicates high industrial application.

What is claimed is:

1. An image processing device comprising:
  an image reader that optically reads a first image of an image processing object having a non-contact element attached thereto, the non-contact element including a memory member;
  an identification information reader that reads identification information from the memory member, the identification information being used for identifying the image processing object; and
  an incorporating unit that combines the first image and a second image corresponding to the identification information;

a controller that performs a control operation so that the first image reduced to a size corresponding to an output region of the second image is recovered to an original size of the first image and is output, when a combined image of the first image and the second image is output.

2. The image processing device according to claim 1, further comprising:
a printer that removes the second image from the combined image of the first image and the second image, and recovers a size of the combined image to the original size and prints out the combined image on a recording medium having a non-contact element attached thereto, the non-contact element including a memory member; and
an identification information writer that writes the identification information on the memory member of the recording medium.

3. The image processing device according to claim 2, wherein the printer prints out the combined image in a size equivalent to the first image, when the recording medium has a size equivalent to the size of the image processing object.

4. An image processing device comprising:
a printer that eliminates an output of a second image from image information to be output by integrally forming a first image and the second image corresponding to identification information for identifying a recording medium, and enlarges the first image so as to enter a region in which the second image is to be printed out, the first image being printed out on the recording medium; and
an identification information writer that writes the identification information on a memory member contained in a non-contact element attached to the recording medium.

5. An image processing system comprising:
a first image processing device that includes: an image reader that optically reads a first image of an image processing object having a non-contact element attached thereto, the non-contact element including a memory member; an identification information reader that reads identification information from the memory member, the identification information identifying the image processing object; and a transmitter that encrypts image information based on the first image and the identification information, and transmits the encrypted image information and the encrypted identification information; and
a second image processing device that includes: a receiver that receives the image information and the identification information; a printer that prints out a first image based on the image information on a recording medium having a non-contact element attached thereto, the non-contact element including a memory member, the first image being enlarged so as to enter a region in which a second image corresponding to the identification information is to be printed out; and an identification information writer that writes the identification information on the memory member.

6. A computer readable recording medium storing a program causing a computer to execute a process for image processing, the process comprising:
optically reading a first image of an image processing object having a non-contact element attached thereto, the non-contact element including a memory member;
reading identification information from the memory member, the identification information being used for identifying the image processing object;
combining the first image and a second image corresponding to the identification information; and
performing a control operation so that the first image reduced to a size corresponding to an output region of the second image is recovered to an original size of the first image and is output, when a combined image of the first image and the second image is output.

7. The computer readable recording medium according to claim 6, wherein the process further comprises:
removing the second image from the combined image of the first image and the second image, and recovering a size of the combined image to the original size and printing out the combined image on a recording medium having a non-contact element attached thereto, the non-contact element including a memory member; and
writing the identification information on the memory member.

8. An image processing method comprising:
optically reading a first image of an image processing object having a non-contact element attached thereto, the non-contact element including a memory member;
reading identification information from the memory member, the identification information being used for identifying the image processing object;
combining the first image and a second image corresponding to the identification information; and
performing a control operation so that the first image reduced to a size corresponding to an output region of the second image is recovered to an original size of the first image and is output, when a combined image of the first image and the second image is output.

9. The image processing device according to claim 1, wherein the combined image is output to a display.

10. The computer readable recording medium according to claim 6, wherein the combined image is output to a display.

* * * * *